United States Patent
Xia et al.

(10) Patent No.: US 10,671,474 B2
(45) Date of Patent: Jun. 2, 2020

(54) MONITORING NODE USAGE IN A DISTRIBUTED SYSTEM

(71) Applicant: Alibaba Group Holding Limited, George Town (KY)

(72) Inventors: Yucai Xia, Hangzhou (CN); Erpeng Chang, Hangzhou (CN); Jie Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 153 days.

(21) Appl. No.: 15/969,364

(22) Filed: May 2, 2018

(65) Prior Publication Data

US 2018/0253350 A1 Sep. 6, 2018

Related U.S. Application Data

(63) Continuation of application No. PCT/CN2016/103173, filed on Oct. 25, 2016.

(30) Foreign Application Priority Data

Nov. 3, 2015 (CN) .......................... 2015 1 0734236

(51) Int. Cl.
*G06F 11/07* (2006.01)
*G06F 11/30* (2006.01)
(Continued)

(52) U.S. Cl.
CPC ...... *G06F 11/0793* (2013.01); *G06F 11/0709* (2013.01); *G06F 11/3006* (2013.01);
(Continued)

(58) Field of Classification Search
CPC .... G06F 11/07; G06F 11/079; G06F 11/0793; G06F 11/0709
(Continued)

(56) References Cited

U.S. PATENT DOCUMENTS

| 6,597,777 | B1 | 7/2003 | Ho |
| 8,635,617 | B2 * | 1/2014 | Adler .................. G06F 11/3006 |
| | | | 718/100 |

(Continued)

FOREIGN PATENT DOCUMENTS

| CN | 101491061 | 7/2009 |
| CN | 102045182 | 5/2011 |

(Continued)

OTHER PUBLICATIONS

PCT International Preliminary Report on Patentability in International Application No. PCT/CN2016/103173, dated May 8, 2018, 11 pages (with English translation).

(Continued)

*Primary Examiner* — Kamini B Patel
(74) *Attorney, Agent, or Firm* — Fish & Richardson P.C.

(57) ABSTRACT

One or more service call chains in a distributed service system are identified, each service call chain including one or more service nodes that are sequentially called by clients of the distributed service system. A service call model corresponding to a particular service call chain is generated from the one or more service call chains. Calls to the particular service call chain by the clients of the distributed service system are identified. Performance statistics in the service call model are updated for the particular service call chain, wherein the performance statistics is updated based on the identified calls to the particular service call chain. A performance problem associated with the particular service call chain is identified based on the updated performance statistics. In response to identifying the performance problem associated with the particular service call chain, corrective action for the identified performance problem is initiated.

15 Claims, 10 Drawing Sheets

(51) Int. Cl.
  *G06F 11/34* (2006.01)
  *H04L 12/24* (2006.01)
(52) U.S. Cl.
  CPC ...... *G06F 11/3409* (2013.01); *H04L 41/5054* (2013.01); *H04L 41/0654* (2013.01); *H04L 41/5016* (2013.01)
(58) Field of Classification Search
  USPC ........................................................ 714/47.1
  See application file for complete search history.

(56) References Cited

U.S. PATENT DOCUMENTS

| | | | |
|---|---|---|---|
| 2004/0059746 | A1 | 3/2004 | Error et al. |
| 2007/0027974 | A1* | 2/2007 | Lee .................... H04L 41/0681 709/223 |
| 2007/0263541 | A1 | 11/2007 | Cobb et al. |
| 2012/0188879 | A1* | 7/2012 | Huang ................ H04L 41/5035 370/242 |
| 2014/0025995 | A1* | 1/2014 | Narayanan .......... G06F 11/0706 714/37 |
| 2014/0362682 | A1* | 12/2014 | Guichard ............ H04L 41/5038 370/221 |
| 2015/0227411 | A1 | 8/2015 | Yi et al. |
| 2016/0105350 | A1* | 4/2016 | Greifeneder .......... H04L 41/046 709/224 |
| 2016/0117196 | A1* | 4/2016 | Talwar .................... G06F 13/14 718/104 |
| 2016/0234073 | A1* | 8/2016 | Maes ...................... H04L 41/12 |
| 2019/0349423 | A1* | 11/2019 | Xin ..................... H04L 67/1029 |

FOREIGN PATENT DOCUMENTS

| | | |
|---|---|---|
| CN | 102360295 | 2/2012 |
| CN | 102594851 | 7/2012 |
| CN | 102945283 | 2/2013 |
| CN | 103186417 | 7/2013 |
| CN | 103269280 | 8/2013 |
| CN | 103401944 | 11/2013 |
| JP | 2005190277 | 7/2005 |
| KR | 20150094260 | 8/2015 |
| WO | 0215462 | 2/2002 |

OTHER PUBLICATIONS

PCT Written Opinion of the International Searching Authority in International Application No. PCT/CN2016/103173, dated Jan. 16, 2017, 10 pages (with English translation).
International Search Report by the International Searching Authority issued in International Application No. PCT/CN2016/103173 dated Jan. 16, 2017; 9 pages.
Japanese Office Action in Japanese Patent Application No. 2018-522941, dated Aug. 22, 2019, 6 pages (with Machine Translation).
Oi et al. "A Study of methods for Estimating Failure Causes on Service Function Chaining," The Institute of Electronics, Information and Communication Engineers, Proceedings of the 2015 IEICE General Conference, Feb. 24, 2015, 2:528 (with Machine translation).
Search Report and Written Opinion by the Intellectual Property Office of Singapore issued in Singapore Applictaion No. 11201803696Q dated Aug. 14, 2018; 11 pages.
Extended European Search Report issued in EP Application No. 16861456.8 dated Sep. 18, 2018; 7 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

MONITORING NODE USAGE IN A DISTRIBUTED SYSTEM

This application is a continuation of PCT Application No. PCT/CN2016/103173, filed on Oct. 25, 2016, which claims priority to Chinese Patent Application No. 201510734236.2, filed on Nov. 3, 2015, and each application is hereby incorporated by reference in its entirety.

TECHNICAL FIELD

The present application relates to the field of computer technologies, and in particular, to a service call information processing technology.

BACKGROUND

With development of the Internet, scales of network-based applications, such as a service platform and an online shopping mall, are gradually expanded, and a distributed service system is utilized. More and more application services are more closely interconnected and interdependent, hence, call relationships in a distributed system are intricate. When a service runs, because of internal factors and external factors, the same service is not always called. Therefore, when an error occurs in a service running process, it is difficult to locate and monitor the error. In the existing technology, an error is located based on a log or by tracking a service call path, and the error is monitored by monitoring a failed service call when the service runs.

However, the existing method for locating an error based on a log or by tracking a service call path is complex, time-consuming, and less accurate. A failed service call is usually monitored after the error occurs, hence, no error can be avoided and no error alert can be issued in advance.

SUMMARY

An objective of the present application is to provide a service call information processing method and device, so as to locate an error, monitor service running, and issue an alert during service running in a distributed system.

To achieve the foregoing objective, according to an aspect of the present application, the present application provides a service call information processing method, so as to locate an error, monitor service running, and issue an alert during service running in a distributed system. The method includes: acquiring one or more service call chains in a distributed service system, where each service call chain includes one or more service nodes that are sequentially called; constructing a corresponding service call model according to a service call chain; and processing the service call chain according to the service call model.

According to another aspect of the present application, the present application provides a service call information processing device, so as to locate an error, monitor service running, and issue an alert during service running in a distributed system. The device includes: a service call chain acquisition apparatus, configured to acquire one or more service call chains in a distributed service system, where each service call chain includes one or more service nodes that are sequentially called; a service call model construction apparatus, configured to construct a corresponding service call model according to a service call chain; and a processing apparatus, configured to process the service call chain according to the service call model.

Compared with the existing technology, in the present application, a service call chain that includes call sequence information of service nodes in the distributed service system is acquired. The service call model is constructed based on service call chains that have a same call sequence of service nodes so as to analyze the call information of the service nodes based on the service call model, regularly monitor a service call and quickly locate a running error based on the analysis, and perform analysis and monitoring by using big data information of the service nodes, thereby improving error locating efficiency in the distributed service system and increasing reliability of the distributed service system.

BRIEF DESCRIPTION OF DRAWINGS

To make other features, objectives, and advantages of the present application clearer, the following describes non-restrictive embodiments in detail with reference to the following accompanying drawings.

Same or similar reference numerals in the accompanying drawings represent same or similar components.

DESCRIPTION OF EMBODIMENTS

The following further describes the present application in detail with reference to accompanying drawings.

In a typical configuration of the present application, a terminal, a device in a service network, and a trusted party all include one or more processors (CPUs), input/output interfaces, network interfaces, and memories.

The memory can include a volatile memory, a random access memory (RAM), and/or a non-volatile memory, etc.

in a computer readable medium, for example, a read-only memory (ROM) or a flash memory (flash RAM). The memory is an example of the computer readable medium.

The computer readable medium can include a non-volatile medium, a volatile medium, a removable medium, or a non-removable medium that can implement information storage by using any method or technology. The information can be a computer readable instruction, a data structure, a program module, or other data. Examples of a computer storage medium include but are not limited to: a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory storage device, a compact disc read-only memory (CD-ROM), a digital versatile disc (DVD) or another optical storage, a magnetic cassette, a magnetic tape, a magnetic disk or another magnetic storage device, or any other non-transmission medium that can be used to store information accessible to a computing device. Based on a definition in the present specification, the computer readable medium does not include computer-readable transitory media (transitory media) such as a modulated data signal and a carrier.

Figure 1:
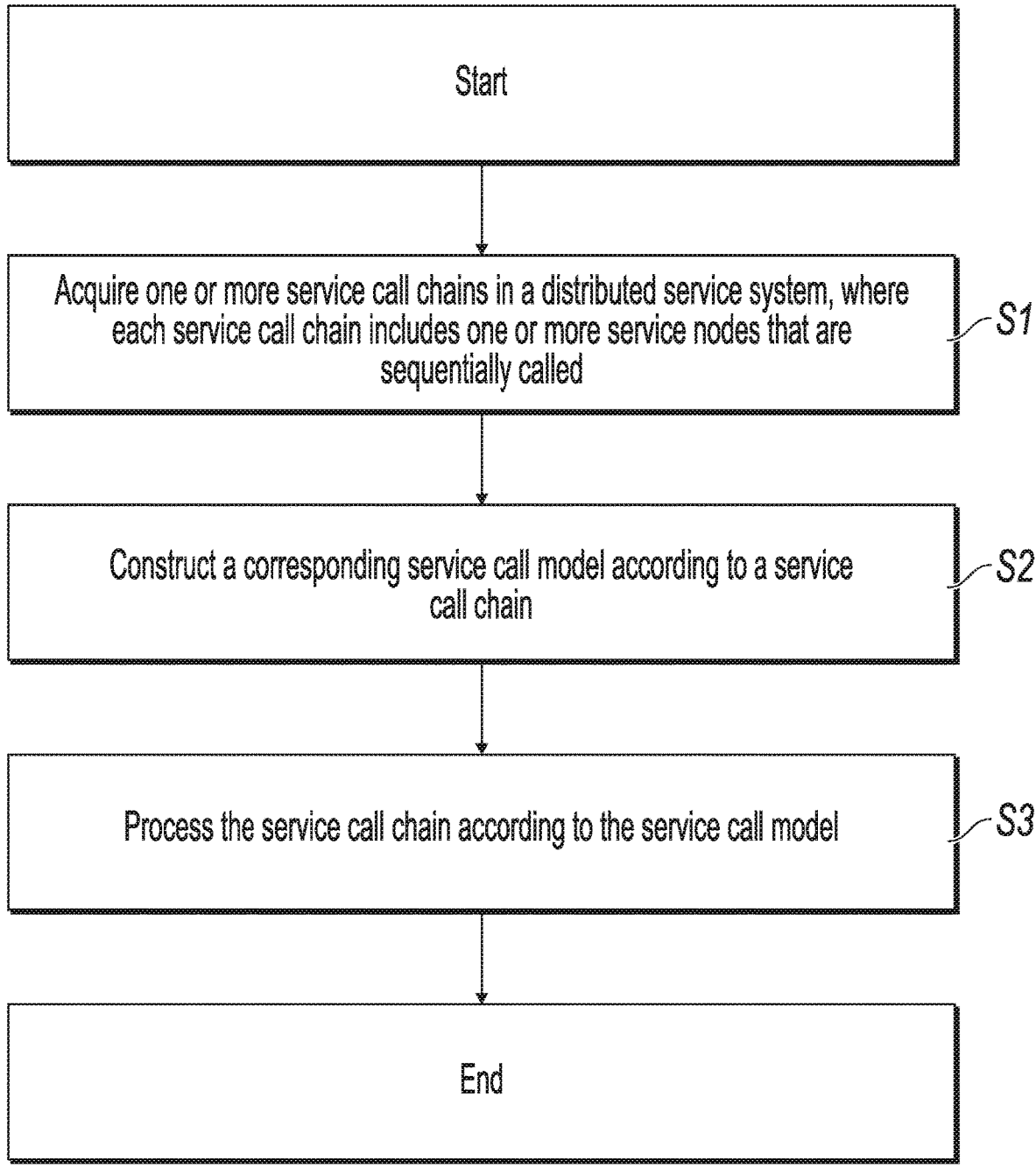
FIG. 1 is a flowchart illustrating a service call information processing method according to an aspect of the present application.

FIG. 1 is a flowchart illustrating a service call information processing method according to an aspect of the present application. A procedure includes step S1, step S2, and step S3.

In step S1, a device 1 acquires one or more service call chains in a distributed service system, where each service call chain includes one or more service nodes that are sequentially called. In step S2, the device 1 constructs a corresponding service call model according to a service call chain. In step S3, the device 1 processes the service call chain according to the service call model.

Figure 9:
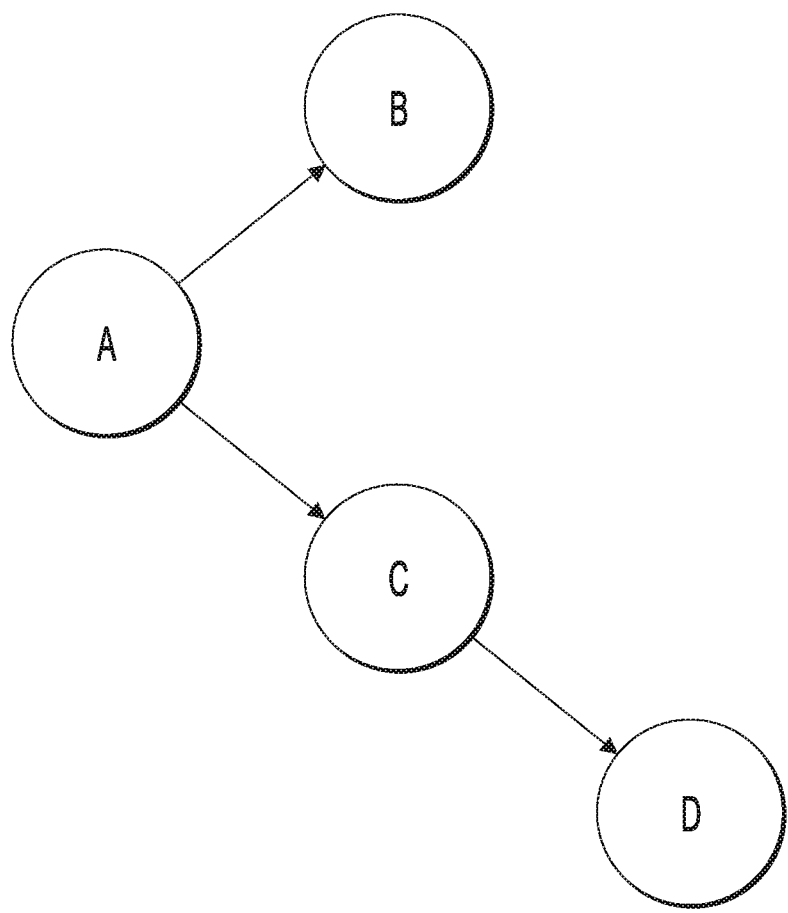
FIG. 9 is a schematic diagram illustrating a service call according to still yet another preferred embodiment of the present application.

Specifically, in the present step S1, the device 1 acquires the one or more service call chains in the distributed service system, where each service call chain includes the one or more service nodes that are sequentially called. Here, the distributed service system includes but is not limited to a software system that orients to a service architecture or is constructed in a distributed system. The service node includes but is not limited to a service or a function called in the distributed service system. For example, service nodes for purchasing a product on an e-commerce platform include calling a user's name, calling a user's associated account, calling a payment page, acquiring security verification, checking an account balance, etc. The service call chain refers to related service nodes and a sequence of the related service nodes for completing a service call at a time in the distributed service system. For example, FIG. 9 is a schematic diagram illustrating a service call in which an ingress of a service call chain is a service node A; and A, B, C, and D that are marked with circles represent service nodes, the ingress of the schematic service call chain is the service node A, B first needs to be called and C then needs to be called to complete the service node A, D needs to be called to complete C, and therefore, the service call nodes in the service call chain in the service call shown in FIG. 9 are sequentially called, that is, a call sequence of the shown service call chain is A→B→C→D. In order that a call sequence of the service nodes in the service call chain shown in FIG. 9 is easily identified in a computer language, according to the call sequence of the service nodes, the initial ingress node can be marked as A0, and B that is called next is marked as B0.1, that is, 0 represents A, and 1 following a symbol "." indicates that B is a first service node that is called after A; C that is then called is marked as C0.2, that is, 0 represents A, and 2 after the symbol "." indicates that C is a second node that is called after A; and then, because D needs to be called to complete C, it can be seen that D is called to complete C, and D is marked as D0.2.1, that is, 0 represents A, 2 after the symbol "." represents C, and 1 following the latter symbol "." indicates that D is a first node that is called after C. Therefore, the call chain shown in the topology diagram in FIG. 9 can be expressed as A0, B0.1, C0.2, and D0.2.1. The sequence marking method is used only as an example, and a digit representing a sequence and a topology can be recorded in a log when each node is called. For example, in the log, a recorded field representing this call is X, and in several fields after the field X, a digit and a dot that represent the topology and the call sequence of the service node are recorded, so as to acquire the service call chain based on a service call record in the log. The service call chain that includes the related called service nodes and the call sequence of the service nodes is acquired, so as to clearly show a service call process and acquire a topology and a feature of each service call.

A person skilled in the art should understand that the foregoing methods for acquiring the service call chain and marking the service call chain are used only as examples. If other existing or future possible methods for acquiring a service call chain and marking the service call chain are applicable to the present application, the other methods shall fall within the protection scope of the present application, which is incorporated herein by reference.

Then, in step S2, the device 1 constructs the corresponding service call model according to the service call chain. The service call model is a service call chain that is constructed based on a topology structure of the service call chain and that has a same node call sequence. For example, when there are enough samples of acquired service call chains, same service call chains appear in platforms or application systems of a same service provider. For example, in one day, users all over the nation perform, for 30,000 times, service calls related to the service nodes shown in FIG. 9, call sequences of the service nodes are the same and topologies of the service nodes are the same, and as such, the 30,000 service calls correspond to a same service call model, that is, A0, B0.1, C0.2, and D0.2.1 in the foregoing example. A process of acquiring a service call model by summarizing several service call chains that have a same topology and a same call sequence of service nodes is a construction process. The service call model corresponding to the service call chains is constructed, so as to analyze the service call chains based on big data samples more clearly. In addition, the constructed model can represent a type of service call, so as to facilitate subsequent analysis of data in each model based on the service call model.

Then, in step S3, the device 1 processes the service call chain according to the service call model. Data of the service call chain that has a same topology sequence and a same call sequence of service nodes as the service call model is analyzed based on the service call model. Call data of each service node, for example, call completion time of each node and a call success or failure, varies in different situations. However, a call rule of each service node can be observed when there are enough data samples. For example, call completion time of a specific service node is normally less than 0.1 second (s), for another example, normally, less than 10 call failures appear in feedback information of a specific service node, and as such, a call rule acquired by analyzing, based on the service call model, the data of the service call chain that has the same topology sequence and the same call sequence of service nodes can be used to locate an error and monitor whether a call in the distributed system is normal. For example, the call completion time of the specific service node is normally less than 0.1 s as in the foregoing example, and time of calling the service node for 100 times in specific duration exceeds 10 times of 0.1 s for more than 50 times, hence, it can be detected that a call error of the service node exists.

A person skilled in the art should understand that the foregoing service call chain processing method is used only as an example. If another existing or future possible service call chain processing method is applicable to the present application, the another service call chain processing method shall fall within the protection scope of the present application, which is incorporated herein by reference.

Figure 2:
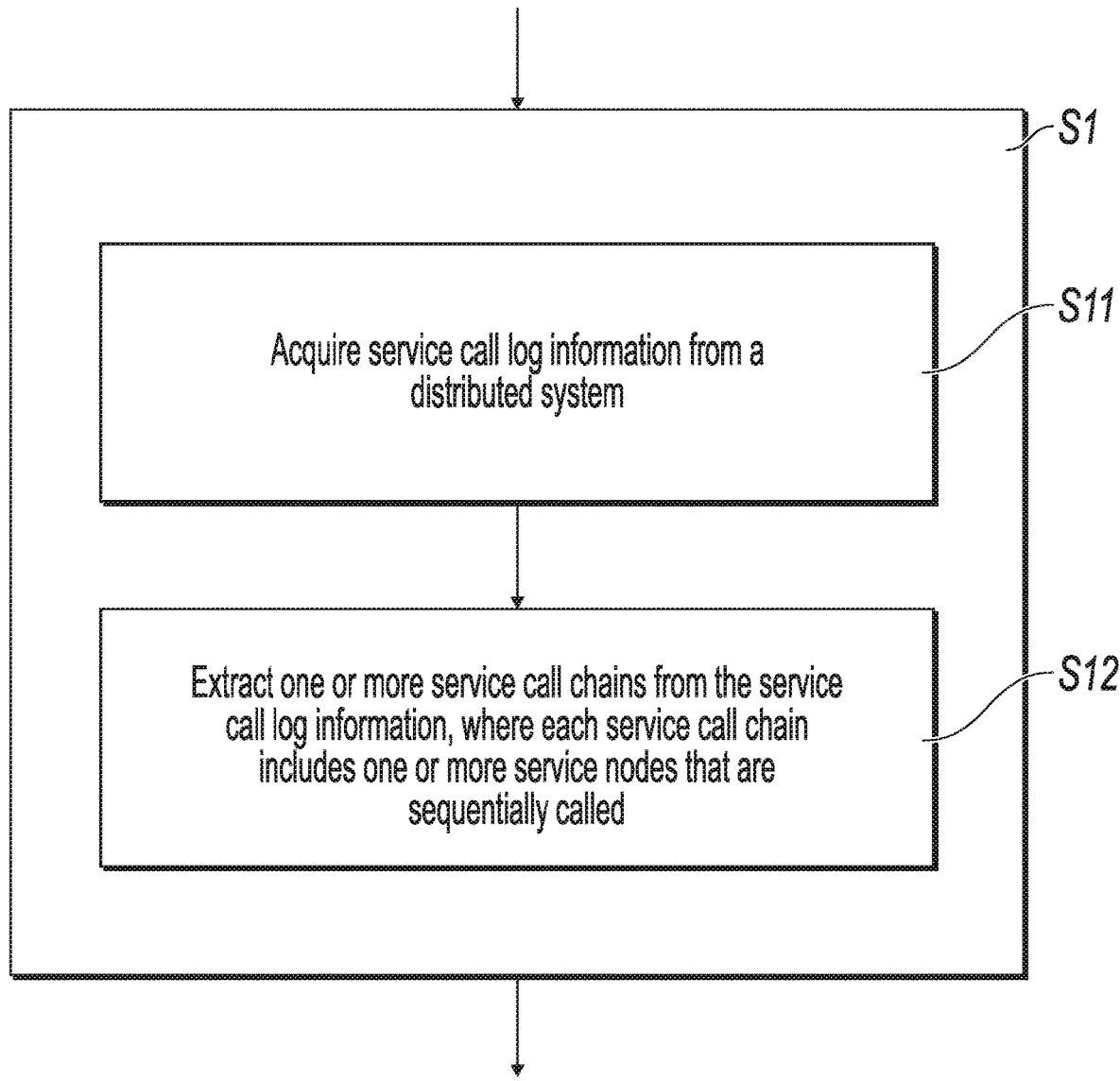
FIG. 2 is a flowchart illustrating step S1 in a service call information processing method according to another preferred embodiment of the present application.

FIG. 2 is a flowchart illustrating step S1 in a service call information processing method according to another preferred embodiment of the present application. The present step S1 includes step S11 and step S12.

In step S11, a device 1 acquires service call log information from a distributed system. In step S12, the device 1 extracts one or more service call chains from the service call log information, where each service call chain includes one or more service nodes that are sequentially called.

Specifically, in step S11, the device 1 acquires the service call log information from the distributed system. The service call log information records a mark and sequence information of each service node each time each service node is called, and other information that can be used to determine a sequence and a topology in each service call. For example, because a node is called for more than once in a specific period, if the node is marked according to a call sequence in which the node is marked as D0.2.1 in the service call shown in FIG. 9 in the foregoing example, two or more call processes probably start from a starting point, a first service node is then called, and the node after a second service node is called and is marked as 0.2.1. Therefore, each service call needs to be marked and recorded in a log when each node is called. For example, in the log, a field representing the call shown in FIG. 9 is recorded as X, that is, X indicates that a specific completed service call from the ingress A to D is marked as X, so as to read the field marking the call when the log information is acquired. For another example, digits representing a sequence and a topology are recorded in the log when each node is called as in the foregoing example, so as to read, when the log information is acquired, fields that mark a topology and a call sequence of the service node in the service call chain. The foregoing service call log information is acquired, so as to link nodes in the service call and acquire the service call chain.

A person skilled in the art should understand that the foregoing service call log recording method is used only as an example. If another existing or future possible service call log recording method is applicable to the present application, the another service call log recording method shall fall within the protection scope of the present application, which is incorporated herein by reference.

Then, in step S12, the device 1 extracts one or more service call chains from the service call log information, where each service call chain includes the one or more service nodes that are sequentially called. That is, the log information records the mark and the sequence information of each service node each time each service node is called, and the other information that can be used to determine the sequence and the topology in each service call; and based on the mark, the sequence information, and the other information, information about a related call sequence and a related topology is extracted in a unit of a service call, and the nodes are linked, so as to generate a service call chain for each service call. For example, acquired call log information is "alipay,com.alipay.chashier.xxx,0x0boc123,0.2.1,AE001 . . . ", and the log is divided by commas. The first field is a system name: alipay, and the second field represents an interface method. The third field represents a mark of one service call, the fourth field represents a sequence and a topology during the call, and the fifth field is a return code "AE001" representing an execution result of the call. In a rear part of the log, more fields can be omitted by using a symbol " . . . ". That is, according to the mark recording the service call, third fields in all logs are searched, all service call nodes including "0x0boc123" are searched, call sequences and topologies for nodes corresponding to identified log records are sorted based on the field recorded in the fourth field recorded by using the marking method in the foregoing example, and finally, the service call chain is formed in a format such as A0, B0.1, C0.2, and D0.2.1.

A person skilled in the art should understand that the foregoing method for extracting the service call chain from the log information is used only as an example. If another existing or future possible method for extracting a service call chain from log information is applicable to the present application, the another method shall fall within the protection scope of the present application, which is incorporated herein by reference.

Preferably, in step S12, the device 1 constructs the corresponding service call model by performing aggregation processing on the service call chain, where the service call model includes one or more service call topologies, and each service call topology is acquired by performing aggregation processing on one or more service call chains. All service call models include a same service call topology. That is, the service call models are acquired by performing aggregation on service call chains that have the same service call topology. For example, in the acquired service call chains as in the foregoing example, 30,000 service call chains are expressed as A0, B0.1, C0.2, and D0.2.1, 20,000 service call chains are expressed as A0, B0.1, and C0.2, and one service call chain is expressed as A0 and B0.1; and a service call model 001 can be acquired by performing aggregation on the 30,000 service call chains, a service call model 002 is acquired by performing aggregation on the 20,000 service call chains, and a single service call chain is used as a service call model 003. That is, the service call model represents all service call chains that include same service nodes and a same call topology and a same sequence of the service nodes, so as to analyze and monitor a data call performed by the service node in the service call chain by using the service call model.

In step S3, the device 1 processes the corresponding service call chain according to the service call topology. That is, based on a service call topology in the service call model acquired by means of aggregation, data of a service call chain that has a same call topology as the service call model is analyzed. As in the foregoing example, data of each service node in the 30,000 service call chains is analyzed by using the service call model: A0, B0.1, C0.2, and D0.2.1. For example, an analysis shows that an acquired probability of a call display error of one service call node is 1/10,000 per hour, and another service call chain that has the same service call topology as the service call model is then monitored according to the analysis result, so as to report an error when the probability of the display error of the service call node exceeds 1/10,000 per hour. Therefore, the service call chain is processed based on the service call topology, so as to effectively monitor a system when there are a relatively large quantity of data samples, and improve alerting performance and stability of the system.

Preferably, the device further performs step S4 (not shown), and in step S4, the device 1 performs a cleaning operation on the service call topology. The cleaning operation is to filter out unimportant call object information. There are two service calls that have the same call node topology as the service chain shown in FIG. 9 as in the foregoing example. Some information is additionally queried about when a service node C is called. For example, a cache C1 is queried in the first service call chain, and if none is acquired, a database C2 is queried for one time; and then data is stored in a cache C3. However, data is acquired by querying a cache C1 in the second service call chain directly. Before performing the cleaning operation, the service call chains can be two different chains. That is, the node C further calls a node C1, a node C2, and a node C3. Because these queried nodes are usually faulty within a system and return no execution result, and call results of the nodes are usually fed back to the node C, the node C1, the node C2, and the node C3 can be cleaned off and ignored. In addition, an intermediate node, etc. that are queried for routing have no influence on the model and can be cleaned off, so as to highlight a call situation of key service nodes and make the service call topology more accurate.

A person skilled in the art should understand that the foregoing service call topology cleaning method is used only as an example. If another existing or future possible service call topology cleaning method is applicable to the present application, the another service call topology cleaning method shall fall within the protection scope of the present application, which is incorporated herein by reference.

Further, in step S3, the device 1 processes the corresponding service call chain according to the cleaned service call topology. That is, the service call chains that are acquired after the cleaning operation is performed and that have the same service call topology are aggregated according to log information of the service call chains, so as to construct the service call model, and specific aggregation and construction methods are the same as the foregoing methods.

More preferably, the cleaning operation includes at least one of the following: deleting a predetermined service node in the service call topology, where a called service node that does not belong to a remote service, for example, an intermediate service node or a call node queried for routing is filtered out; deleting a service node that is in the service call topology and that does not return call result information, where the service node that includes a call operation performed within the system and returns no service call result such as an execution result is filtered out, for example, querying and calling the cache or calling a database; deleting an occasionally used service node in the service call topology, where the number of accumulated appearance times of the occasionally used service node in the service call chain corresponding to the service call topology is less than or equal to a predetermined occasionally used threshold, where a specific threshold of call times is set, and call times in log information or other historical information are read, so as to delete a service node that is used only in very few situations or used occasionally when a specific complete service call chain is normally finished, thereby reducing data analysis and processing burdens of the system and acquiring a more accurate service call model and accurate data; or deleting an occasionally used service node in the service call topology, where the number of accumulated appearance times of the occasionally used service node in the service call chain corresponding to the service call topology is less than or equal to a predetermined occasionally used threshold, and the number of accumulated appearance times of another service node, other than the occasionally used service node, in the service call chain corresponding to the service call topology is greater than or equal to a predetermined frequently used threshold, where a specific threshold of call times is set, and call times in log information or other historical information are read, so as to select a main service node or a specially maintained service node and delete infrequently used service nodes, thereby analyzing and monitoring data particularly.

Preferably, in step S2, the device 1 performs aggregation processing on the service call chain with reference to call feedback information of the service node in the service call chain, so as to construct a corresponding service call model, where the service call model includes one or more service call topologies, and each service call topology is acquired by performing aggregation processing on one or more service call chains. The call feedback information refers to a return node of each service node after each service node is called, and the return node is used to represent an execution result of the service node. The call feedback information includes a specific execution result and identifiable information formed by different situations based on a specific predetermined rule, for example, an execution success or failure, and a specific service scenario. In the service call chain shown in FIG. 9, if the node B is successfully called, SUCC is fed back; if the node D is successfully called, call feedback information is AE00; call feedback information of the node C is AE01; and call feedback information of the node A is AE10. This indicates that the node C needs to be called after the node B is successfully called to call the node A, and the node D needs to be first called to call the node C. The call feedback information can be recorded in a log, so that the call feedback information can also be queried when call topology information of calling the service node at a specific time is queried. Each service node corresponds to several pieces of call feedback information, and call feedback information of a rear end of the service call chain usually affects call feedback information of a front end of the service call chain, but aggregation can be performed on both ends of the call feedback information at the front end of the service call chain. For example, the service node A shown in FIG. 9 returns information about system abnormality, which can indicate that the service node C or the service node D has a network access problem or that the database is abnormal, hence, each service call chain can be a combination of the call feedback information. Therefore, when aggregation is performed on service call chains that have a same topology to construct a service call model, to clearly locate an error for different service call chains, all call feedback information combinations are recorded in the chains and used for a subsequent data analysis based on the service call model.

A person skilled in the art should understand that the foregoing methods for recording and presenting call feedback information are used only as examples. If other existing or future possible methods for recording and presenting call feedback information are applicable to the present application, the other methods shall fall within the protection scope of the present application, which is incorporated herein by reference.

Figure 3:
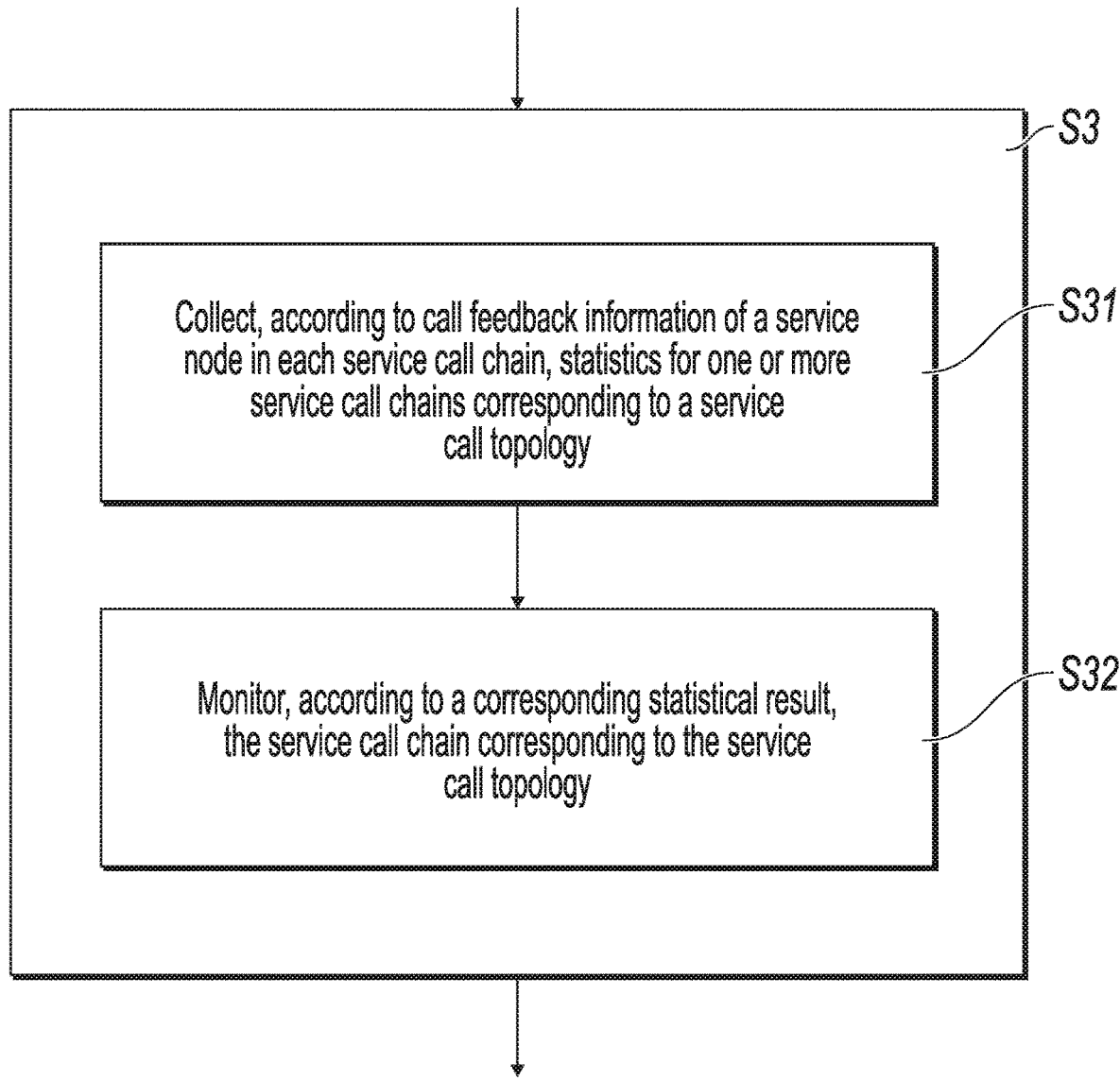
FIG. 3 is a flowchart illustrating step S3 in a service call information processing method according to still another preferred embodiment of the present application.

FIG. 3 is a flowchart illustrating step S3 in a service call information processing method according to still another preferred embodiment of the present application. Step S3 includes step S31 and step S32.

In step S31, the device 1 collects, according to call feedback information of a service node in each service call chain, statistics for the one or more service call chains corresponding to the service call topology. In step S32, the device 1 monitors, according to a corresponding statistical result, the service call chain corresponding to the service call topology.

Specifically, in step S31, the device 1 collects, according to the call feedback information of the service node in each service call chain, the statistics for the one or more service call chains corresponding to the service call topology. That is, call feedback information in all service call chains that correspond to the service call model and that have the same service call topology is analyzed, and statistics about the call feedback information are collected. For example, based on the topology relationship of the generated service call model and the service call chains, all the service call chains that have the same service call topology are marked with a mark of the service call model, that is, each service call model has a particular mark, and a unique mark is assigned to each service call chain with reference to the mark and a call feedback information combination in each service call chain. Statistics about call feedback information in the service call chain are collected, and call feedback information states of service nodes in each service call chain are collectively analyzed by means of chain comparison or parallel comparison during fixed time.

A person skilled in the art should understand that the foregoing call feedback information analysis-based data analysis method is used only as an example. If another existing or future possible call feedback information analysis-based data analysis method is applicable to the present application, the another method shall fall within the protection scope of the present application, which is incorporated herein by reference.

Then, in step S32, the device 1 monitors, according to a corresponding statistical result, the service call chain corresponding to the service call topology. That is, call feedback information of a same node in the service call topology is compared and data is monitored at intervals of fixed time when there are enough data samples. For example, the data greater than 95% of statistical samples is in a normal state. When the 5% of the abnormal situations occur in the system, the abnormality will be identified by the system by means of monitoring. Because there is the call feedback information for each service call node, a service chain corresponding to a specific service call model can be located after the abnormal states are identified by means of monitoring. As in the foregoing example, a specific service chain and a called service node in the service chain are located according to the unique mark corresponding to each service chain.

A person skilled in the art should understand that the foregoing analysis result-based service call monitoring method is used only as an example. If another existing or future possible analysis result-based service call monitoring method is applicable to the present application, the another method shall fall within the protection scope of the present application, which is incorporated herein by reference.

Figure 4:
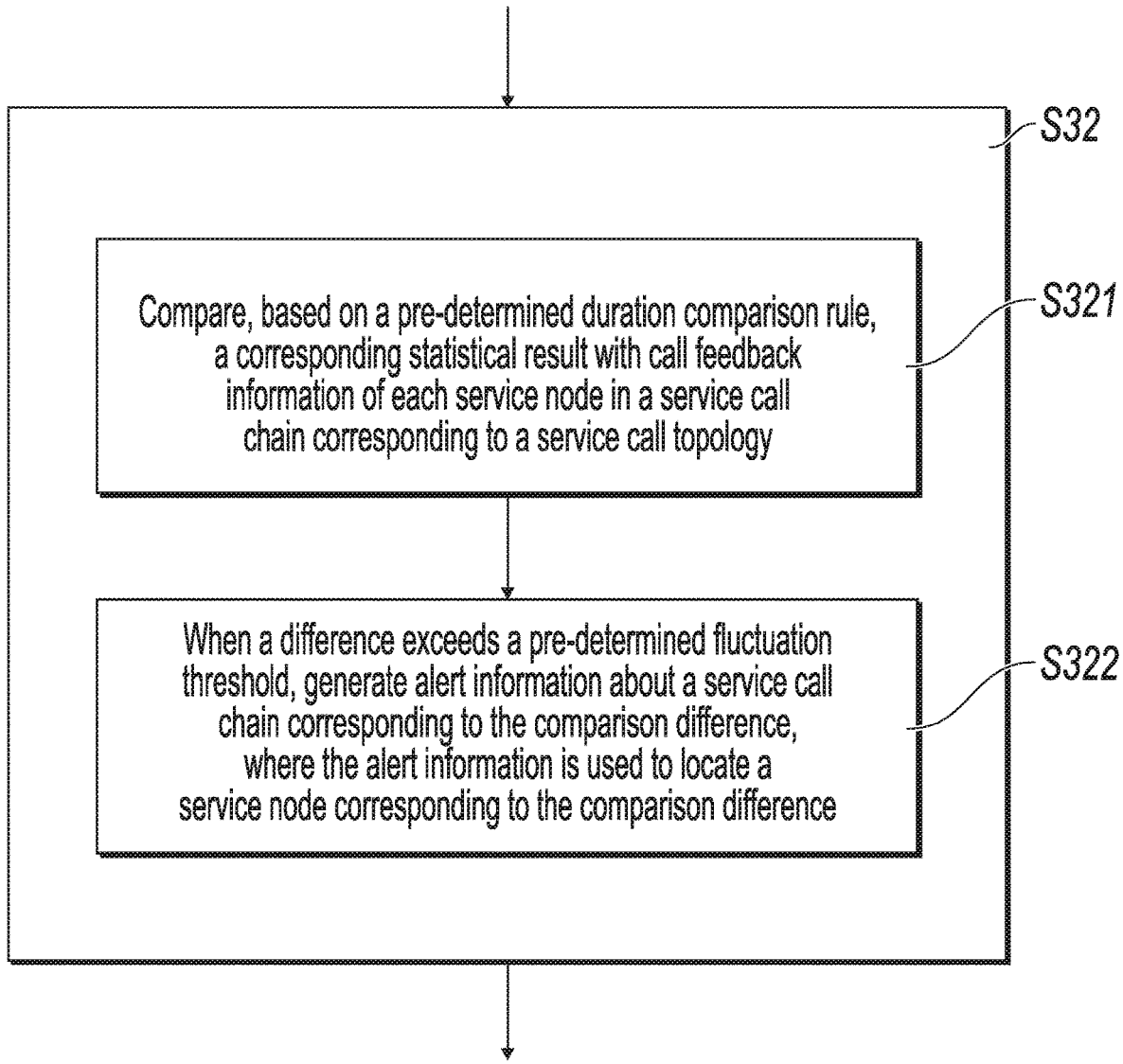
FIG. 4 is a flowchart illustrating step S32 in a service call information processing method according to yet another preferred embodiment of the present application.

FIG. 4 is a flowchart illustrating step S32 in a service call information processing method according to yet another preferred embodiment of the present application. Step S32 includes step S321 and step S322.

In step S321, the device 1 compares, based on a predetermined duration comparison rule, the corresponding statistical result with call feedback information of each service node in the service call chain corresponding to the service call topology. In step S322, when a difference exceeds predetermined fluctuation threshold, the device 1 generates alert information about a service call chain corresponding to the difference, where the alert information is used to locate a service node corresponding to the difference.

Specifically, in step S321, the device 1 compares, based on the predetermined duration comparison rule, the corresponding statistical result with the call feedback information of each service node in the service call chain corresponding to the service call topology. That is, according to a specific duration comparison rule, call feedback information of all service call chains is analyzed based on the same service call topology. For example, a chain comparison analysis is performed on data generated from 8 a.m. to 9 a.m. and call feedback information generated from 9 a.m. to 10 a.m. in service call chains that have the same service call topology. For another example, a parallel comparison analysis is performed on data generated from 8 a.m. to 9 a.m. on March 2nd and call feedback information generated from 8 a.m. to 9 a.m. on March 3rd in the service call chains that have the same service call topology. Hence, ranges of data generated during normal operation in different scenarios can be acquired. For example, a daily payment failure probability indicates that insufficient balance appears for 100 times in completed payment. Then, a service call status in the system can be monitored based on these analysis results.

A person skilled in the art should understand that the foregoing methods for acquiring and comparing statistical results are used only as examples. If other existing or future possible methods for acquiring and comparing statistical results are applicable to the present application, the other methods shall fall within the protection scope of the present application, which is incorporated herein by reference.

Then, in step S322, when the difference exceeds the predetermined fluctuation threshold, the device 1 generates the alert information about the service call chain corresponding to the difference, where the alert information is used to locate the service node corresponding to the difference. After the service call chains that have a same topology and a same service model are analyzed based on the call feedback information, data, generated during daily operation, of the service call chains that have the same topology is monitored according to the acquired ranges of data generated during normal operation in different scenarios, and a normal range is set to a specific threshold. For example, as in the foregoing example, if the daily payment failure probability indicates that insufficient balance appears for 100 times in completed payment, a threshold of faulty feedback times of a service node for checking a balance is set to be less than or equal to 100 or 120. When daily faulty feedback times of the service node for checking the balance in the system exceed the set threshold, an alert is issued, and the faulty node is tracked down based on a global unique mark formed by service call chain information and call feedback information.

A person skilled in the art should understand that the foregoing methods for monitoring and alerting are used only as examples. If other existing or future possible methods for monitoring and alerting are applicable to the present application, the other methods shall fall within the protection scope of the present application, which is incorporated herein by reference.

Figure 5:
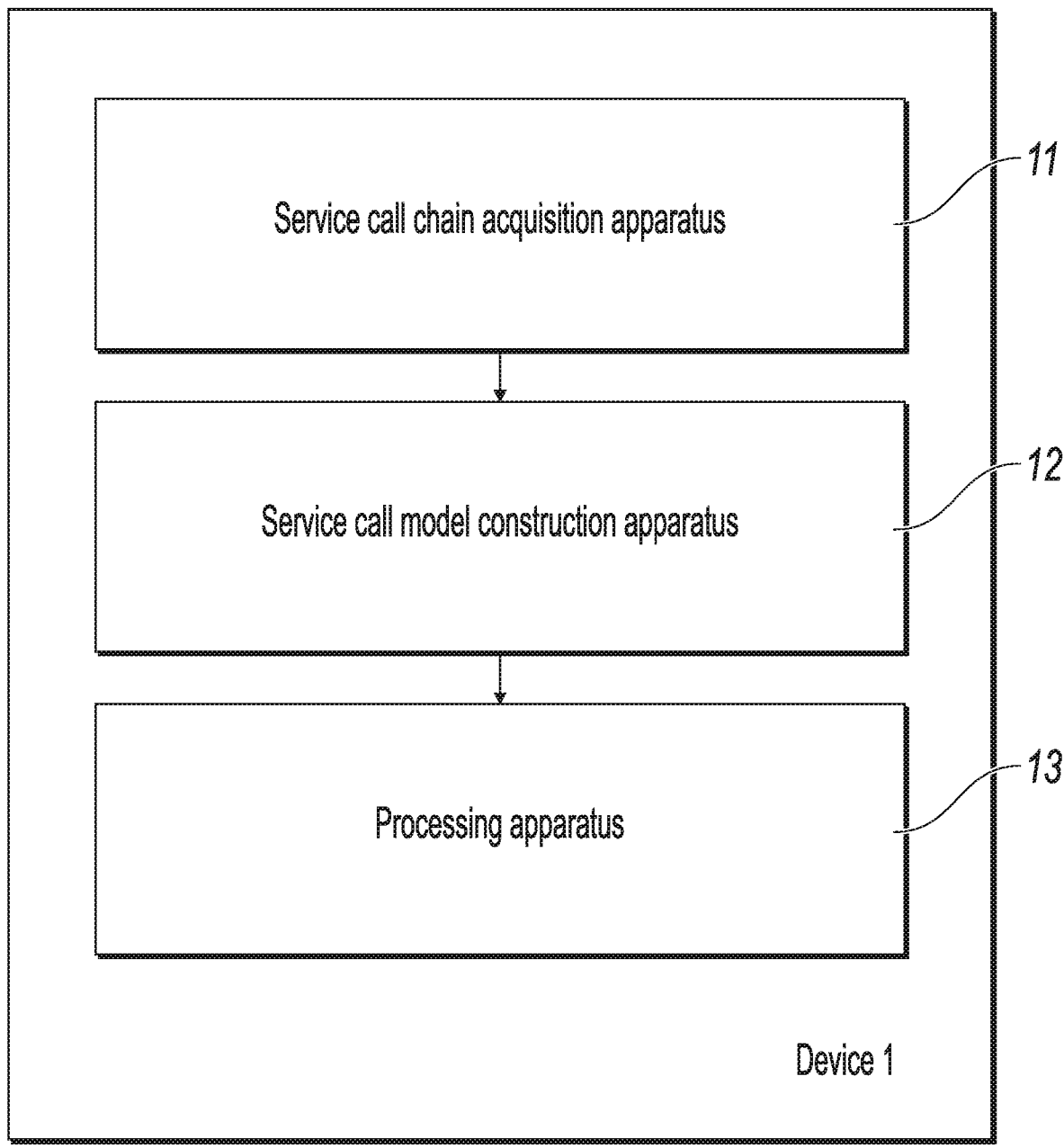
FIG. 5 is a schematic diagram illustrating a service call information processing device according to another aspect of the present application.

FIG. 5 is a schematic diagram illustrating a service call information processing device according to another aspect of the present application. The device 1 includes a service call chain acquisition apparatus 11, a service call model construction apparatus 12, and a processing apparatus 13.

In the device 1, the service call chain acquisition apparatus 11 acquires one or more service call chains in a distributed service system, where each service call chain includes one or more service nodes that are sequentially called; the service call model construction apparatus 12 constructs a corresponding service call model according to a service call chain; and the processing apparatus 13 processes the service call chain according to the service call model.

Specifically, the service call chain acquisition apparatus 11 acquires the one or more service call chains in the distributed service system, where each service call chain includes the one or more service nodes that are sequentially called. Here, the distributed service system includes but is not limited to a software system that orients to a service architecture or is constructed in a distributed system. The service node includes but is not limited to a service or a function called in the distributed service system. For example, service nodes for purchasing a product on an e-commerce platform include calling a user's name, calling a user's associated account, calling a payment page, acquiring security verification, checking an account balance, etc. The service call chain refers to related service nodes and a sequence of the related service nodes for completing a service call at a time in the distributed service system. For example, FIG. 9 is a schematic diagram illustrating a service call in which an ingress of a service call chain is a service node A; and A, B, C, and D that are marked with circles represent service nodes, the ingress of the schematic service call chain is the service node A, B first needs to be called and C then needs to be called to complete the service node A, D needs to be called to complete C, and therefore, the service call nodes in the service call chain in the service call shown in FIG. 9 are sequentially called, that is, a call sequence of the shown service call chain is A→B→C→D. In order that a call sequence of the service nodes in the service call chain shown in FIG. 9 is easily identified in a computer language, according to the call sequence of the service nodes, the initial ingress node can be marked as A0, and B that is called next is marked as B0.1, that is, 0 represents A, and 1 following a symbol "." indicates that B is a first service node that is called after A; C that is then called is marked as C0.2, that is, 0 represents A, and 2 after the symbol "." indicates that C is a second node that is called after A; and then, because D needs to be called to complete C, it can be seen that D is called to complete C, and D is marked as D0.2.1, that is, 0 represents A, 2 after the symbol "." represents C, and 1 following the latter symbol "." indicates that D is a first node that is called after C. Therefore, the call chain shown in the topology diagram in FIG. 9 can be expressed as A0, B0.1, C0.2, and D0.2.1. The sequence marking method is used only as an example, and a digit representing a sequence and a topology can be recorded in a log when each node is called. For example, in the log, a recorded field representing this call is X, and in several fields after the field X, a digit and a dot that represent the topology and the call sequence of the service node are recorded, so as to acquire the service call chain based on a service call record in the log. The service call chain that includes the related called service nodes and the call sequence of the service nodes is acquired, so as to clearly show a service call process and acquire a topology and a feature of each service call.

A person skilled in the art should understand that the foregoing methods for acquiring the service call chain and marking the service call chain are used only as examples. If other existing or future possible methods for acquiring a service call chain and marking the service call chain are applicable to the present application, the other methods shall fall within the protection scope of the present application, which is incorporated herein by reference.

Then, the service call model construction apparatus 12 constructs a corresponding service call model according to a service call chain. The service call model is a service call chain that is constructed based on a topology structure of the service call chain and that has a same node call sequence. For example, when there are enough samples of acquired service call chains, same service call chains appear in platforms or application systems of a same service provider. For example, in one day, users all over the nation perform, for 30,000 times, service calls related to the service nodes shown in FIG. 9, call sequences of the service nodes are the same and topologies of the service nodes are the same, and as such, the 30,000 service calls correspond to a same service call model, that is, A0, B0.1, C0.2, and D0.2.1 in the foregoing example. A process of acquiring a service call model by summarizing several service call chains that have a same topology and a same call sequence of service nodes is a construction process. The service call model corresponding to the service call chains is constructed, so as to analyze the service call chains based on big data samples more clearly. In addition, the constructed model can represent a type of service call, so as to facilitate subsequent analysis of data in each model based on the service call model.

Then, the processing apparatus 13 processes the service call chain according to the service call model. Data of the service call chain that has a same topology sequence and a same call sequence of service nodes as the service call model is analyzed based on the service call model. Call data of each service node, for example, call completion time of each node and a call success or failure, varies in different situations. However, a call rule of each service node can be observed when there are enough data samples. For example, call completion time of a specific service node is normally less than 0.1 s, for another example, normally, less than 10 call failures appear in feedback information of a specific service node, and as such, a call rule acquired by analyzing, based on the service call model, the data of the service call chain that has the same topology sequence and the same call sequence of service nodes can be used to locate an error and monitor whether a call in the distributed system is normal. For example, the call completion time of the specific service node is normally less than 0.1 s as in the foregoing example, and time of calling the service node for 100 times in specific duration exceeds 10 times of 0.1 s for more than 50 times, hence, it can be detected that a call error of the service node exists.

A person skilled in the art should understand that the foregoing service call chain processing method is used only as an example. If another existing or future possible service call chain processing method is applicable to the present application, the another service call chain processing method shall fall within the protection scope of the present application, which is incorporated herein by reference.

Figure 6:
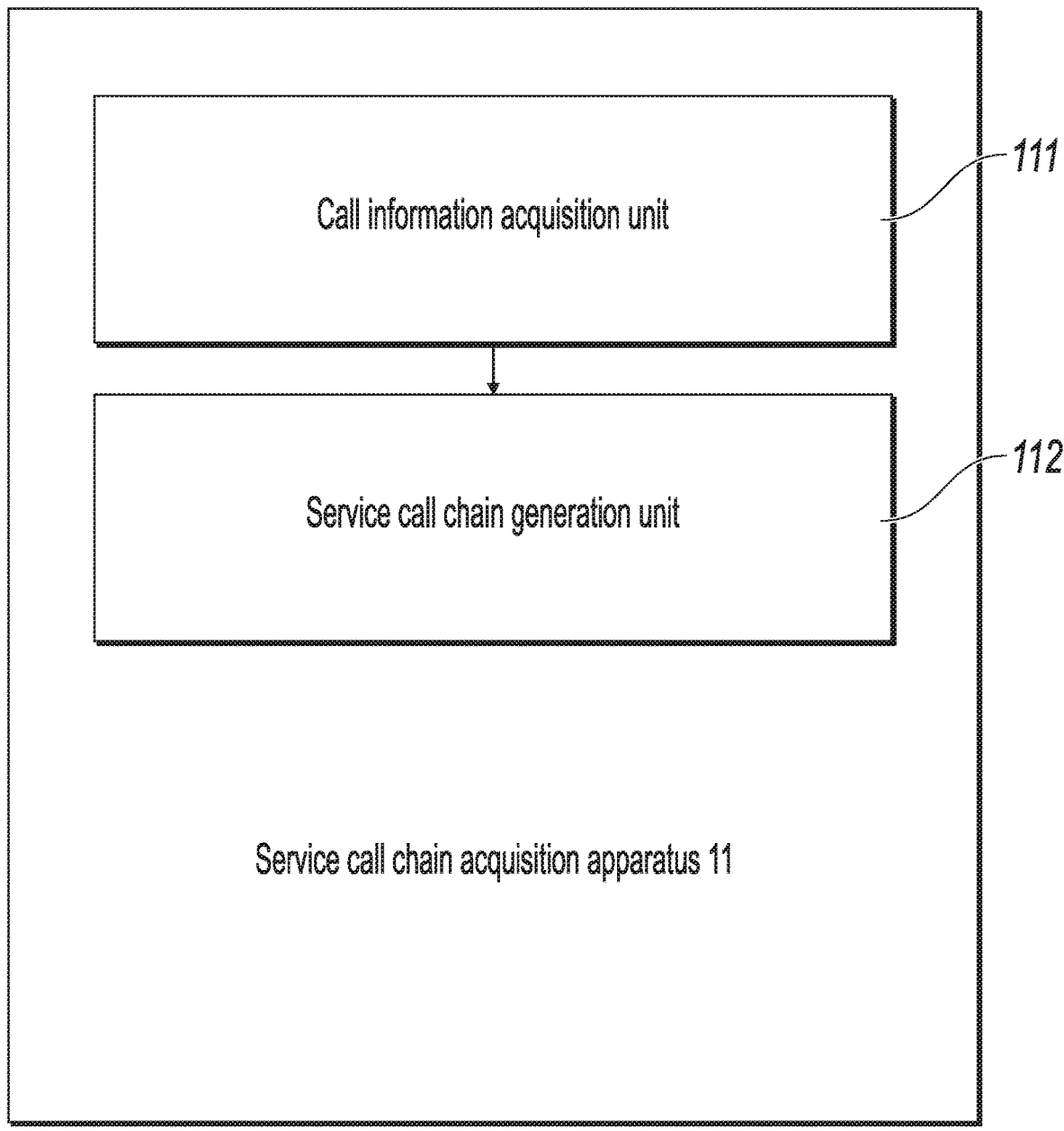
FIG. 6 is a schematic diagram illustrating a service call chain acquisition apparatus in a service call information processing device according to another preferred embodiment of the present application.

FIG. 6 is a schematic diagram illustrating a service call chain acquisition apparatus in a service call information processing device according to another preferred embodiment of the present application. The service call chain acquisition apparatus 11 includes a call information acquisition unit 111 and a service call chain generation unit 112.

The call information acquisition unit 111 acquires service call log information from a distributed system. The service call chain generation unit 112 extracts one or more service call chains from the service call log information, where each service call chain includes the one or more service nodes that are sequentially called.

Specifically, the call information acquisition unit 111 acquires the service call log information from the distributed system. The service call log information records a mark and sequence information of each service node each time each service node is called, and other information that can be used to determine a sequence and a topology in each service call. For example, because a node is called for more than once in a specific period, if the node is marked according to a call sequence in which the node is marked as D0.2.1 in the service call shown in FIG. 9 in the foregoing example, two or more call processes probably start from a starting point, a first service node is then called, and the node after a second service node is called and is marked as 0.2.1. Therefore, each service call needs to be marked and recorded in a log when each node is called. For example, in the log, a field representing the call shown in FIG. 9 is recorded as X, that is, X indicates that a specific completed service call from the ingress A to D is marked as X, so as to read the field marking the call when the log information is acquired. For another example, digits representing a sequence and a topology are recorded in the log when each node is called as in the foregoing example, so as to read, when the log information is acquired, fields that mark a topology and a call sequence of the service node in the service call chain. The foregoing service call log information is acquired, so as to link nodes in the service call and acquire the service call chain.

A person skilled in the art should understand that the foregoing service call log recording method is used only as an example. If another existing or future possible service call log recording method is applicable to the present application, the another service call log recording method shall fall within the protection scope of the present application, which is incorporated herein by reference.

Then, the service call chain generation unit 112 extracts the one or more service call chains from the service call log information, where each service call chain includes the one or more service nodes that are sequentially called. That is, the log information records the mark and the sequence information of each service node each time each service node is called, and the other information that can be used to determine the sequence and the topology in each service call; and based on the mark, the sequence information, and the other information, information about a related call sequence and a related topology is extracted in a unit of a service call, and the nodes are linked, so as to generate a service call chain for each service call. For example, acquired call log information is "alipay,com.alipay.chashier.xxx,0x0boc123,0.2.1,AE001 . . . ", and the log is divided by commas. The first field is a system name: alipay, and the second field represents an interface method. The third field represents a mark of one service call, the fourth field represents a sequence and a topology during the call, and the fifth field is a return code "AE001" representing an execution result of the call. In a rear part of the log, more fields can be omitted by using a symbol " . . . ". That is, according to the mark recording the service call, third fields in all logs are searched, all service call nodes including "0x0boc123" are searched, call sequences and topologies for nodes corresponding to identified log records are sorted based on the field recorded in the fourth field recorded by using the marking method in the foregoing example, and finally, the service call chain is formed in a format such as A0, B0.1, C0.2, and D0.2.1.

A person skilled in the art should understand that the foregoing method for extracting the service call chain from the log information is used only as an example. If another existing or future possible method for extracting a service call chain from log information is applicable to the present application, the another method shall fall within the protection scope of the present application, which is incorporated herein by reference.

Preferably, the service call model construction apparatus 12 constructs the corresponding service call model by performing aggregation processing on the service call chain, where the service call model includes one or more service call topologies, and each service call topology is acquired by performing aggregation processing on one or more service call chains. All service call models include a same service call topology. That is, the service call models are acquired by performing aggregation on service call chains that have the same service call topology. For example, in the acquired service call chains as in the foregoing example, 30,000 service call chains are expressed as A0, B0.1, C0.2, and D0.2.1, 20,000 service call chains are expressed as A0, B0.1, and C0.2, and one service call chain is expressed as A0 and B0.1; and a service call model 001 can be acquired by performing aggregation on the 30,000 service call chains, a service call model 002 is acquired by performing aggregation on the 20,000 service call chains, and a single service call chain is used as a service call model 003. That is, the service call model represents all service call chains that include same service nodes and a same call topology and a same sequence of the service nodes, so as to analyze and monitor a data call performed by the service node in the service call chain by using the service call model.

The processing apparatus 13 processes the corresponding service call chain according to the service call topology. That is, based on a service call topology in the service call model acquired by means of aggregation, data of a service call chain that has a same call topology as the service call model is analyzed. As in the foregoing example, data of each service node in the 30,000 service call chains is analyzed by using the service call model: A0, B0.1, C0.2, and D0.2.1. For example, an analysis shows that an acquired probability of a call display error of one service call node is $\frac{1}{10,000}$ per hour, and another service call chain that has the same service call topology as the service call model is then monitored according to the analysis result, so as to report an error when the probability of the display error of the service call node exceeds $\frac{1}{10,000}$ per hour. Therefore, the service call chain is processed based on the service call topology, so as to effectively monitor a system when there are a relatively large quantity of data samples, and improve alerting performance and stability of the system.

Preferably, the device further includes a cleaning apparatus 14 (not shown), and the cleaning apparatus 14 performs a cleaning operation on the service call topology. The cleaning operation is to filter out unimportant call object information. There are two service calls that have the same call node topology as the service chain shown in FIG. 9 as in the foregoing example. Some information is additionally queried about when a service node C is called. For example, a cache C1 is queried in the first service call chain, and if none is acquired, a database C2 is queried for one time; and then data is stored in a cache C3. However, data is acquired by querying a cache C1 in the second service call chain directly. Before performing the cleaning operation, the service call chains can be two different chains. That is, the node C further calls a node C1, a node C2, and a node C3. Because these queried nodes are usually faulty within a system and return no execution result, and call results of the nodes are usually fed back to the node C, the node C1, the node C2, and the node C3 can be cleaned off and ignored. In addition, an intermediate node, etc. that are queried for routing have no influence on the model and can be cleaned off, so as to highlight a call situation of key service nodes and make the service call topology more accurate.

A person skilled in the art should understand that the foregoing service call topology cleaning method is used only as an example. If another existing or future possible service call topology cleaning method is applicable to the present application, the another service call topology cleaning method shall fall within the protection scope of the present application, which is incorporated herein by reference.

Further, the processing apparatus 13 processes the corresponding service call chain according to the cleaned service call topology. That is, the service call chains that are acquired after the cleaning operation is performed and that have the same service call topology are aggregated according to log information of the service call chains, so as to construct the service call model, and specific aggregation and construction methods are the same as the foregoing methods.

More preferably, the cleaning operation includes at least one of the following: deleting a predetermined service node in the service call topology, where a called intermediate service node and a call node queried for routing, etc. are filtered out; deleting a service node that is in the service call topology and that does not return call result information, where the service node that includes a call operation performed within the system and returns no service call result such as an execution result is filtered out, for example, querying and calling the cache or calling a database; deleting an occasionally used service node in the service call topology, where the number of accumulated appearance times of the occasionally used service node in the service call chain corresponding to the service call topology is less than or equal to a predetermined occasionally used threshold, where a specific threshold of call times is set, and call times in log information or other historical information are read, so as to delete a service node that is used only in very few situations or used occasionally when a specific complete service call chain is normally finished, thereby reducing data analysis and processing burdens of the system and acquiring a more accurate service call model and accurate data; or deleting an occasionally used service node in the service call topology, where the number of accumulated appearance times of the occasionally used service node in the service call chain corresponding to the service call topology is less than or equal to a predetermined occasionally used threshold, and the number of accumulated appearance times of another service node, other than the occasionally used service node, in the service call chain corresponding to the service call topology is greater than or equal to a predetermined frequently used threshold, where a specific threshold of call times is set, and call times in log information or other historical information are read, so as to select a main service node or a specially maintained node and delete infrequently used service node, thereby analyzing and monitoring data particularly.

Preferably, the service call model construction apparatus 12 performs aggregation processing on the service call chain with reference to call feedback information of the service node in the service call chain, so as to construct a corresponding service call model, where the service call model includes one or more service call topologies, and each service call topology is acquired by performing aggregation processing on one or more service call chains. The call feedback information refers to a return node of each service node after each service node is called, and the return node is used to represent an execution result of the service node.

The call feedback information includes a specific execution result and identifiable information formed by different situations based on a specific predetermined rule, for example, an execution success or failure, and a specific service scenario. In the service call chain shown in FIG. 9, if the node B is successfully called, SUCC is fed back; if the node D is successfully called, call feedback information is AE00; call feedback information of the node C is AE01; and call feedback information of the node A is AE10. This indicates that the node C needs to be called after the node B is successfully called to call the node A, and the node D needs to be first called to call the node C. The call feedback information can be recorded in a log, so that the call feedback information can also be queried when call topology information of calling the service node at a specific time is queried. Each service node corresponds to several pieces of call feedback information, and call feedback information of a rear end of the service call chain usually affects call feedback information of a front end of the service call chain, but aggregation can be performed on both ends of the call feedback information at the front end of the service call chain. For example, the service node A shown in FIG. 9 returns information about system abnormality, which can indicate that the service node C or the service node D has a network access problem or that the database is abnormal, hence, each service call chain can be a combination of the call feedback information. Therefore, when aggregation is performed on service call chains that have a same topology to construct a service call model, to clearly locate an error for different service call chains, all call feedback information combinations are recorded in the chains and used for a subsequent data analysis based on the service call model.

A person skilled in the art should understand that the foregoing methods for recording and presenting call feedback information are used only as examples. If other existing or future possible methods for recording and presenting call feedback information are applicable to the present application, the other methods shall fall within the protection scope of the present application, which is incorporated herein by reference.

Figure 7:
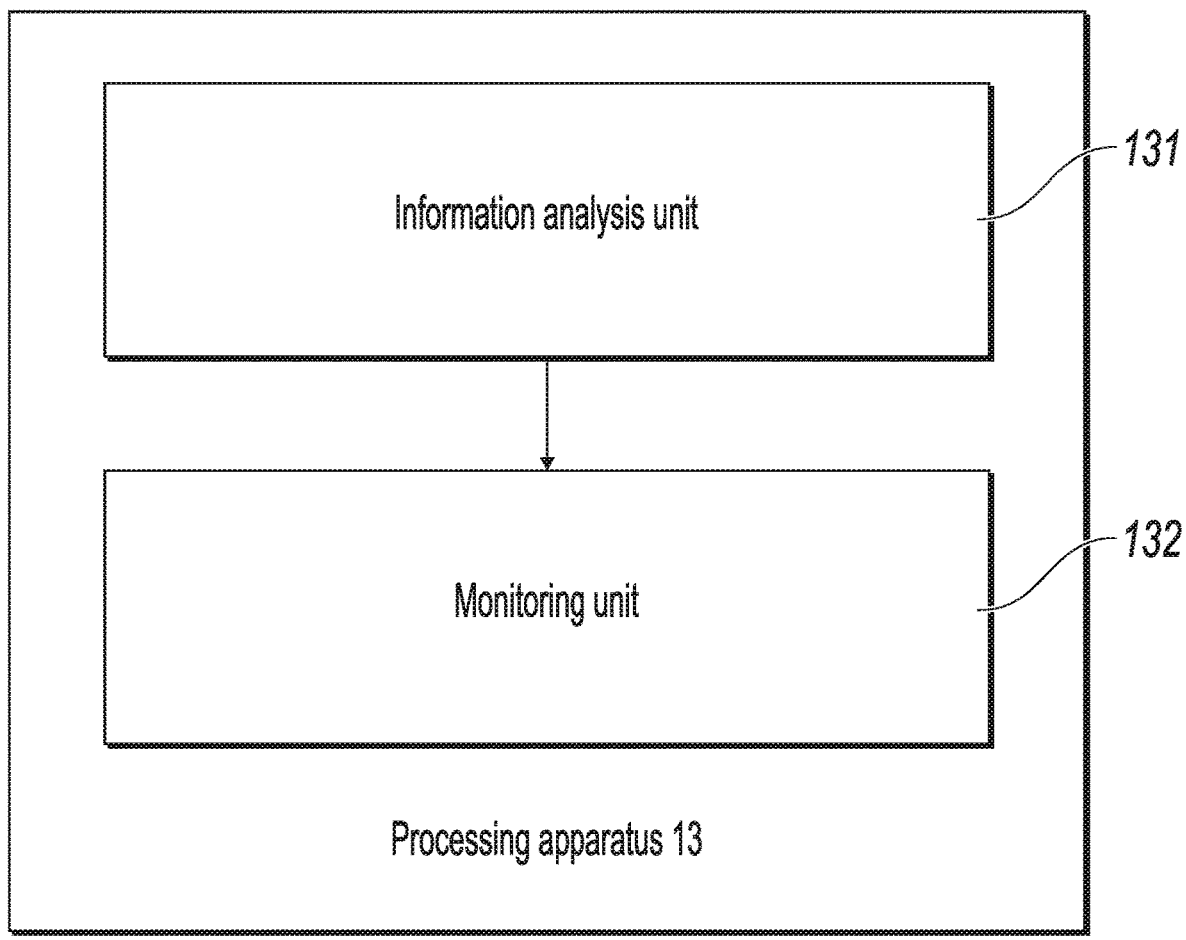
FIG. 7 is a schematic diagram illustrating a processing apparatus in a service call information processing device according to still another preferred embodiment of the present application.

FIG. 7 is a schematic diagram illustrating a processing apparatus in a service call information processing device according to still another preferred embodiment of the present application. The processing apparatus 13 includes an information analysis unit 131 and a monitoring unit 132.

The information analysis unit 131 collects, according to call feedback information of a service node in each service call chain, statistics for the one or more service call chains corresponding to the service call topology. The monitoring unit 132 monitors, according to a corresponding statistical result, the service call chain corresponding to the service call topology.

Specifically, the information analysis unit 131 collects, according to the call feedback information of the service node in each service call chain, the statistics for the one or more service call chains corresponding to the service call topology. That is, call feedback information in all service call chains that correspond to the service call model and that have the same service call topology is analyzed, and statistics about the call feedback information are collected. For example, based on the topology relationship of the generated service call model and the service call chains, all the service call chains that have the same service call topology are marked with a mark of the service call model, that is, each service call model has a particular mark, and a unique mark is assigned to each service call chain with reference to the mark and a call feedback information combination in each service call chain. Statistics about call feedback information in the service call chain are collected, and call feedback information states of service nodes in each service call chain are collectively analyzed by means of chain comparison or parallel comparison during fixed time.

A person skilled in the art should understand that the foregoing call feedback information analysis-based data analysis method is used only as an example. If another existing or future possible call feedback information analysis-based data analysis method is applicable to the present application, the another method shall fall within the protection scope of the present application, which is incorporated herein by reference.

Then, the monitoring unit 132 monitors, according to the corresponding statistical result, the service call chain corresponding to the service call topology. That is, call feedback information of a same node in the service call topology is compared and data is monitored at intervals of fixed time when there are enough data samples. For example, the data greater than 95% of statistical samples is in a normal state. When the 5% of the abnormal situations occur in the system, the abnormality will be identified by the system by means of monitoring. Because there is the call feedback information for each service call node, a service chain corresponding to a specific service call model can be located after the abnormal states are identified by means of monitoring. As in the foregoing example, a specific service chain and a called service node in the service chain are located according to the unique mark corresponding to each service chain.

A person skilled in the art should understand that the foregoing analysis result-based service call monitoring method is used only as an example. If another existing or future possible analysis result-based service call monitoring method is applicable to the present application, the another method shall fall within the protection scope of the present application, which is incorporated herein by reference.

Figure 8:
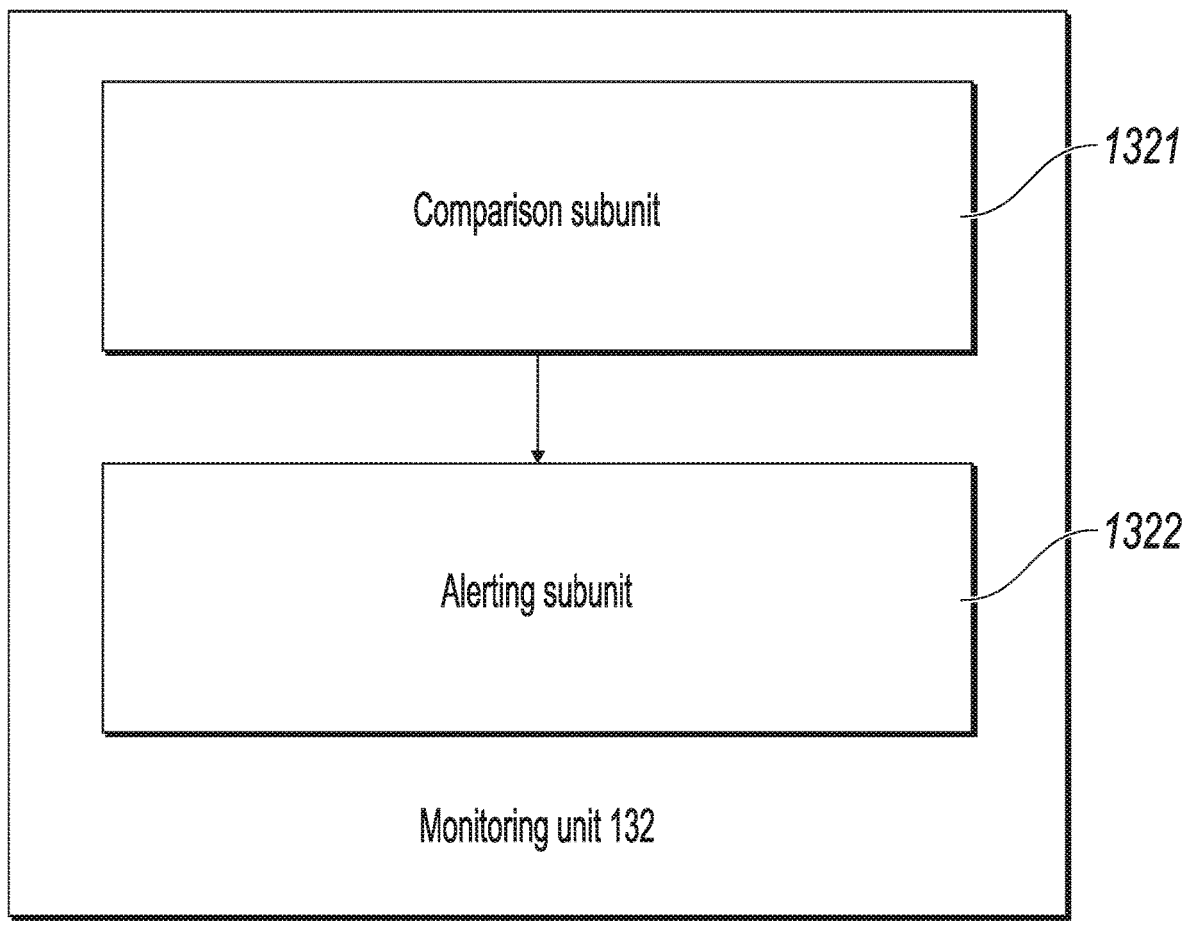
FIG. 8 is a schematic diagram illustrating a monitoring unit in a service call information processing device according to yet another preferred embodiment of the present application.

FIG. 8 is a schematic diagram illustrating a monitoring unit in a service call information processing device according to yet another preferred embodiment of the present application. The monitoring unit 132 includes a comparison subunit 1321 and an alerting subunit 1322.

The comparison subunit 1321 compares, based on a predetermined duration comparison rule, the corresponding statistical result with call feedback information of each service node in the service call chain corresponding to the service call topology; and when a difference exceeds predetermined fluctuation threshold, the alerting subunit 1322 generates alert information about a service call chain corresponding to the difference, where the alert information is used to locate a service node corresponding to the difference.

Specifically, the comparison subunit 1321 compares, based on the predetermined duration comparison rule, the corresponding statistical result with the call feedback information of each service node in the service call chain corresponding to the service call topology. That is, according to a specific duration comparison rule, call feedback information of all service call chains is analyzed based on the same service call topology. For example, a chain comparison analysis is performed on data generated from 8 a.m. to 9 a.m. and call feedback information generated from 9 a.m. to 10 a.m. in service call chains that have the same service call topology. For another example, a parallel comparison analysis is performed on data generated from 8 a.m. to 9 a.m. on March 2nd and call feedback information generated from 8 a.m. to 9 a.m. on March 3rd in the service call chains that have the same service call topology. Hence, ranges of data generated during normal operation in different scenarios can be acquired. For example, a daily payment failure probability indicates that insufficient balance appears for 100 times in completed payment. Then, a service call status in the system can be monitored based on these analysis results.

A person skilled in the art should understand that the foregoing methods for acquiring and comparing statistical results are used only as examples. If other existing or future possible methods for acquiring and comparing statistical results are applicable to the present application, the other methods shall fall within the protection scope of the present application, which is incorporated herein by reference.

Then, when the difference exceeds the predetermined fluctuation threshold, the alerting subunit 1322 generates the alert information about the service call chain corresponding to the difference, where the alert information is used to locate the service node corresponding to the difference. After the service call chains that have a same topology and a same service model are analyzed based on the call feedback information, data, generated during daily operation, of the service call chains that have the same topology is monitored according to the acquired ranges of data generated during normal operation in different scenarios, and a normal range is set to a specific threshold. For example, as in the foregoing example, if the daily payment failure probability indicates that insufficient balance appears for 100 times in completed payment, a threshold of faulty feedback times of a service node for checking a balance is set to be less than or equal to 100 or 120. When daily faulty feedback times of the service node for checking the balance in the system exceed the set threshold, an alert is issued, and the faulty node is tracked down based on a global unique mark formed by service call chain information and call feedback information.

A person skilled in the art should understand that the foregoing methods for monitoring and alerting are used only as examples. If other existing or future possible methods for monitoring and alerting are applicable to the present application, the other methods shall fall within the protection scope of the present application, which is incorporated herein by reference.

Obviously, a person skilled in the art can make various modifications and variations towards the present application without departing from the spirit and scope of the present application. The present application is intended to cover these modifications and variations of the present application provided that they fall within the scope of protection defined by the following claims and their equivalent technologies.

It should be noted that the present application can be implemented in software and/or a combination of software and hardware. For example, the present application can be implemented by using an application-specific integrated circuit (ASIC), a general purpose computer, or any other similar hardware device. In an embodiment, a software program in the present application can be executed by a processor, so as to implement the foregoing steps and functions. Similarly, the software program in the present application (including a related data structure) can be stored in a computer readable storage medium, for example, a RAM memory, a hard disk drive or a DVD-ROM/CD-ROM drive, or a floppy disk and a similar device. In addition, some steps or functions in the present application can be implemented by using hardware, for example, a circuit that cooperates with the processor to execute the steps or the functions.

In addition, a part of the present application can be implemented as a computer program product, such as a computer program instruction. When the computer program instruction is executed by a computer, the methods and/or the technical solutions according to the present application can be invoked or provided by means of operations of the computer. In addition, the program instruction for invoking the method in the present application can be stored in a fixed or removable storage medium, and/or is transmitted by means of broadcast or a data flow in other signal bearer media, and/or is stored in an operating memory of a computer device that operates according to the program instruction. Here, an embodiment according to the present application includes an apparatus, the apparatus includes a memory configured to store a computer program instruction and a processor configured to execute the program instruction, and when the computer program instruction is executed by the processor, the computer program instruction triggers the apparatus to operate based on the preceding methods and/or technical solutions in a plurality of embodiments according to the present application.

A person skilled in the art should understand that the present application is obviously not limited to details in the foregoing exemplary embodiments, and the present application can be implemented in another specific form, without departing from the spirit and basic feature of the present application. Therefore, the embodiments should be considered to be exemplary and non-restrictive, the scope of the present application is limited by the accompanying claims other than the foregoing description, and all changes that fall within a meaning and a scope of equivalent claims of the claims are intended to be included in the present application. No reference numeral in the claims should be considered as a limitation on related claims. In addition, obviously, the term "include" does not exclude another unit or another step, and a singular form does not exclude a plural form. The described multiple units and apparatuses in the apparatus claims can be implemented by means of a unit or an apparatus by using software or hardware. Terms such as "first" and "second" are used to represent names, and do not represent any particular sequence.

Figure 10:
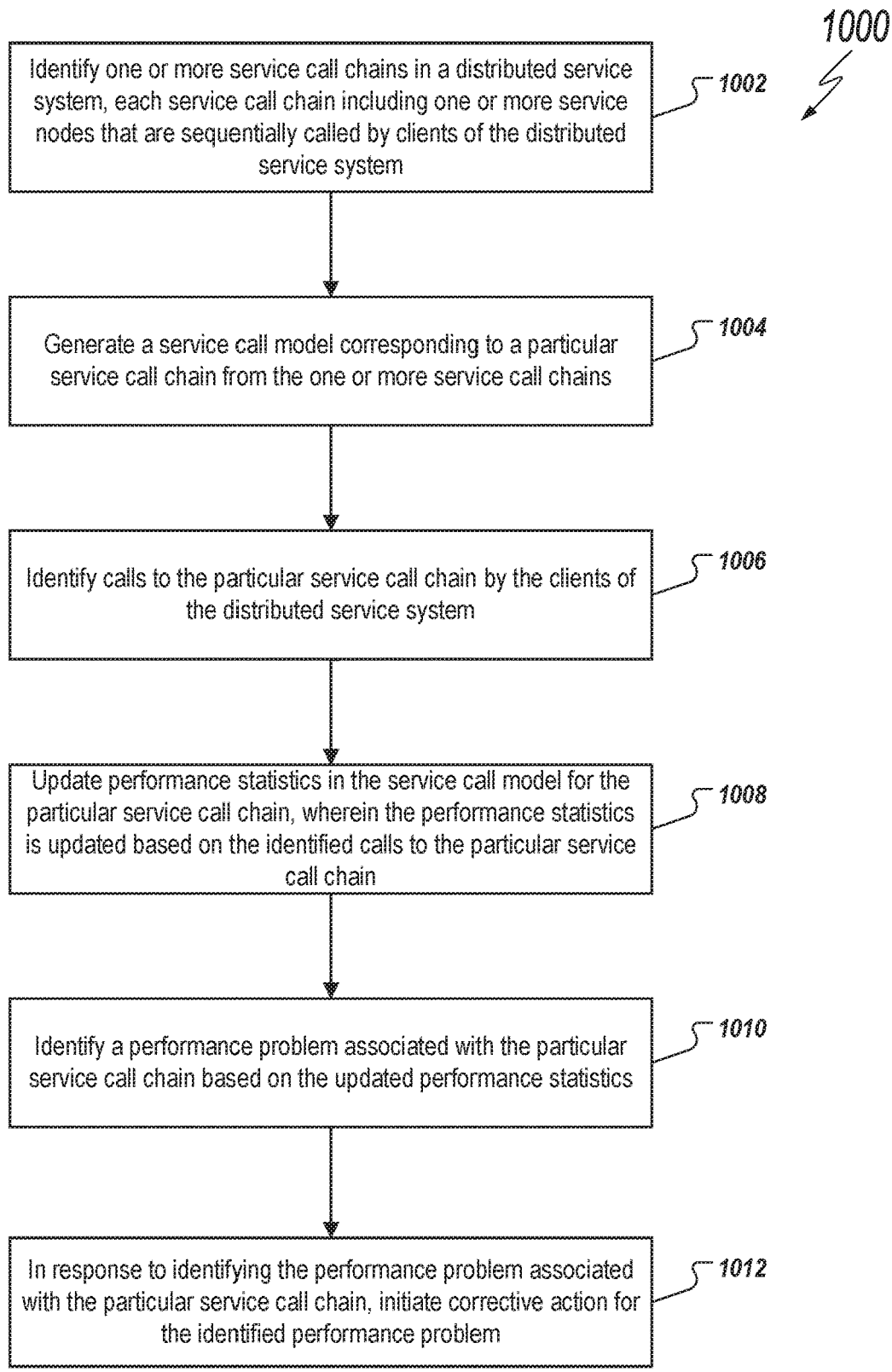
FIG. 10 is a flowchart illustrating an example of a computer-implemented method for processing service call chains, according to an implementation of the present disclosure.

FIG. 10 is a flowchart illustrating an example of a computer-implemented method 1000 for processing service call chains, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, one or more service call chains in a distributed service system are identified. Each service call chain includes one or more service nodes that are sequentially called by clients of the distributed service system. For example, the chain acquisition apparatus 11 can acquire multiple service call chains, such as the service call chain that includes service nodes A, B, C, and D described with reference to FIG. 9. The distributed service system from which the service call chains are acquired can include, for example, a software system that serves a service architecture implemented within a distributed system. The service nodes can include, for example, service nodes for purchasing a product on an e-commerce platform, and the service nodes can correspond to actions taken to obtain purchase information used to complete the purchase of a product or service. Some service calls can occur sequentially, while some service calls can occur in parallel, depending on hierarchical and predecessor/successor relationships. Each successor service call can be made, for example, to complete the predecessor service call that makes the successor service call. In this example, the service call chain can include calling a user's name, calling a user's associated account, calling a payment page, acquiring security verification, checking an account balance, and so on.

In some implementations, identifying the one or more service call chains can include acquiring service call log information from the distributed service system and extracting the one or more service call chains from the service call log information. For example, referring to FIG. 2, device 1 can acquire the service call log information from the distributed system. The service call log information can record a mark (for example, including a timestamp) and sequence information of each service node each time that each service node was called. The service call log information can include other information that can be used to determine a sequence and a topology in each service call chain. From 1002, method 1000 proceeds to 1004.

At 1004, a service call model corresponding to a particular service call chain is generated from the one or more service call chains. As an example, the service call model construction apparatus 12 can construct a service call model that corresponds to service call chains that share a common topology structure, including a same node call sequence. Identification of common topology structures can occur, for example, after there are enough samples of acquired service call chains, such as service call chains for platforms or application systems of a same service provider. As an example, a common topology structure can be a sequence of service nodes described with reference to FIG. 9. The process of constructing the service call model can be completed by summarizing several service call chains that have a same topology and a same call sequence of service nodes.

In some implementations, generating the service call model can include performing aggregation processing on the service call chain, where the service call model includes one or more service call topologies. Each service call topology can be acquired by performing aggregation processing on one or more service call chains. Processing the service call chain can include processing the service call chain according to a service call topology.

In some implementations, a data cleaning operation can be performed on the service call topology so that processing the service call chain can be done according to a cleaned service call topology. In some implementations, the data cleaning operation can include one or more of the following data cleaning operations. First, a predetermined service node can be deleted from the service call topology, such as a service node that is not relevant for consideration. Second, a service node can be deleted if the service node, although being in the service call topology, does not return call result information. Third, an occasionally-used service node in the service call topology can be deleted, for example, when a number of accumulated appearance times of the occasionally-used service node in the service call chain corresponding to the service call topology is less than or equal to a predetermined occasionally-used threshold. Fourth, the occasionally-used service node in the service call topology can be deleted, for example, when: 1) the number of accumulated appearance times of the occasionally-used service node in the service call chain corresponding to the service call topology is less than or equal to the predetermined occasionally-used threshold, and 2) when a number of accumulated appearance times of another service node (different from the occasionally-used service node) is greater than or equal to a predetermined frequently used threshold.

In some implementations, generating the service call model can include using aggregated information that is aggregated from one or more service call chains. For example, aggregation processing can be performed on the service call chain with reference to call feedback information of the service node in the service call chain, and a corresponding service call model can be constructed. The service call model can include one or more service call topologies, where each service call topology is acquired by performing aggregation processing on one or more service call chains. From 1004, method 1000 proceeds to 1006.

At 1006, calls to the particular service call chain by the clients of the distributed service system are identified. For example, the processing apparatus 13 can identify calls to the particular service call chain by the clients of the distributed service system. That is, the processing apparatus 13 can determine that the node C calls the node C1, the node C2, and the node C3. From 1006, method 1000 proceeds to 1008.

At 1008, performance statistics in the service call model are updated for the particular service call chain, wherein the performance statistics is updated based on the identified calls to the particular service call chain. For example, the processing apparatus 13 can analyze each service call chain with respect to the service call model. The analysis can include, for example, analyzing call data of each service node, including call completion times of each node, call success or failure information, and whether success or failure vary in different situations. A call rule for each service node can be generated when there are enough data samples. The call rule can be based, for example, on call completion times (for example, if call completion times are normally less than 0.1 s) and failure rates (for example, if fewer than 10 call failures appear in feedback information of a specific service node). The generated rule can be used to analyze each service call chain (having the same topology sequence and the same call sequence of service nodes) to locate potential problems and to monitor whether a particular call in the distributed system is normal. From 1008, method 1000 proceeds to 1010.

At 1010, a performance problem associated with the particular service call chain is identified based on the updated performance statistics. For example, the processing apparatus 13 can analyze each service call chain with respect to the service call model and identify performance problems, such as slow response times.

In some implementations, identifying the performance problem can include using duration comparison rules to decide when to generate alerts. For example, based on a predetermined duration comparison rule, a comparison can be made between a corresponding statistical result and call feedback information of each service node in the service call chain corresponding to the service call topology. Then, when a difference exceeds a predetermined fluctuation threshold, alert information can be generated about a service call chain corresponding to the difference, and the alert information can identify a service node corresponding to the difference. From 1010, method 1012 proceeds to 1012.

At 1012, in response to identifying the performance problem associated with the particular service call chain, corrective action for the identified performance problem is initiated. For example, information regarding the identified nodes can be provided for presentation to a user or sent to particular ones of the geographically dispersed centers for remedial action. From 1012, method 1000 stops.

Techniques described in the present disclosure can use service call chain information that is acquired from a distributed service system, which may include many geographically dispersed centers and/or servers that are connected by a computer network, including the Internet. The service call chain information can be used to automatically generate models that correspond to groups of service call chains that share common topologies. The generated models can be used to automatically process existing conditions for service call chains regardless of their location. Problems with specific nodes in service call chains, such as response times, can be identified and isolated. Information regarding the identified nodes can be provided for presentation to a user or sent to particular ones of the geographically dispersed centers for remedial action.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
identifying one or more service call chains in a distributed service system, each service call chain including one or more service nodes that are sequentially called by clients of the distributed service system;
performing aggregation processing on the one or more service call chains with reference to call feedback information of the one or more service nodes in the one or more service call chains;
generating a service call model corresponding to a particular service call chain from the one or more service call chains, wherein the service call model comprises one or more service call topologies, and wherein each service call topology is acquired by performing aggregation processing on the one or more service call chains;
identifying calls to the particular service call chain by the clients of the distributed service system;
updating performance statistics in the service call model for the particular service call chain, wherein the performance statistics are updated based on the identified calls to the particular service call chain;
comparing, based on a predetermined duration comparison rule, each statistical result with corresponding call feedback information of each service node in the particular service call chain corresponding to the service call topology;
when a difference exceeds a predetermined fluctuation threshold, generating alert information about the particular service call chain corresponding to the difference, wherein the alert information identifies a service node corresponding to the difference;
identifying, based on the alert information, a performance problem associated with the particular service call chain; and in response to identifying the performance problem associated with the particular service call chain, initiating corrective action for the identified performance problem.

2. The computer-implemented method of claim 1, wherein identifying the one or more service call chains comprises:
   acquiring service call log information from the distributed service system; and
   extracting the one or more service call chains from the service call log information, wherein each service call chain comprises the one or more service nodes that are sequentially called.

3. The computer-implemented method of claim 1, wherein generating the service call model comprises generating the service call model by performing aggregation processing on the service call chain, wherein the service call model comprises one or more service call topologies, wherein each service call topology is acquired by performing aggregation processing on one or more additional service call chains different than the particular service call chain; and
   wherein processing the service call chain comprises processing the service call chain according to a service call topology.

4. The computer-implemented method of claim 3, further comprising:
   performing a data cleaning operation on the service call topology, wherein updating performance statistics in the service call model for the particular service call chain comprises updating performance statistics in the service call model for the particular service call chain according to a cleaned service call topology.

5. The computer-implemented method of claim 4, wherein the data cleaning operation comprises at least one of:
   deleting a predetermined service node in the service call topology;
   deleting a service node that is in the service call topology and that does not return call result information;
   deleting an occasionally-used service node in the service call topology, wherein a number of accumulated appearance times of the occasionally-used service node in the service call chain corresponding to the service call topology is less than or equal to a predetermined occasionally-used threshold; or
   deleting the occasionally-used service node in the service call topology, wherein the number of accumulated appearance times of the occasionally-used service node in the service call chain corresponding to the service call topology is less than or equal to the predetermined occasionally-used threshold, and wherein a number of accumulated appearance times of another service node different from the occasionally-used service node is greater than or equal to a predetermined frequently used threshold.

6. A non-transitory, computer-readable medium storing one or more instructions executable by a computer system to perform operations comprising:
   identifying one or more service call chains in a distributed service system, each service call chain including one or more service nodes that are sequentially called by clients of the distributed service system;
   performing aggregation processing on the one or more service call chains with reference to call feedback information of the one or more service nodes in the one or more service call chains;
   generating a service call model corresponding to a particular service call chain from the one or more service call chains, wherein the service call model comprises one or more service call topologies, and wherein each service call topology is acquired by performing aggregation processing on the one or more service call chains;
   identifying calls to the particular service call chain by the clients of the distributed service system;
   updating performance statistics in the service call model for the particular service call chain, wherein the performance statistics are updated based on the identified calls to the particular service call chain;
   comparing, based on a predetermined duration comparison rule, each statistical result with corresponding call feedback information of each service node in the particular service call chain corresponding to the service call topology;
   when a difference exceeds a predetermined fluctuation threshold, generating alert information about the particular service call chain corresponding to the difference, wherein the alert information identifies a service node corresponding to the difference;
   identifying, based on the alert information, a performance problem associated with the particular service call chain; and
   in response to identifying the performance problem associated with the particular service call chain, initiating corrective action for the identified performance problem.

7. The non-transitory, computer-readable medium of claim 6, wherein identifying the one or more service call chains comprises:
   acquiring service call log information from the distributed service system; and
   extracting the one or more service call chains from the service call log information, wherein each service call chain comprises the one or more service nodes that are sequentially called.

8. The non-transitory, computer-readable medium of claim 6, wherein generating the service call model comprises generating the service call model by performing aggregation processing on the service call chain, wherein the service call model comprises one or more service call topologies, wherein each service call topology is acquired by performing aggregation processing on one or more additional service call chains different than the particular service call chain; and
   wherein processing the service call chain comprises processing the service call chain according to a service call topology.

9. The non-transitory, computer-readable medium of claim 8, the operations further comprising:
   performing a data cleaning operation on the service call topology, wherein updating performance statistics in the service call model for the particular service call chain comprises updating performance statistics in the service call model for the particular service call chain according to a cleaned service call topology.

10. The non-transitory, computer-readable medium of claim 9, wherein the data cleaning operation comprises at least one of:
   deleting a predetermined service node in the service call topology;
   deleting a service node that is in the service call topology and that does not return call result information;

deleting an occasionally-used service node in the service call topology, wherein a number of accumulated appearance times of the occasionally-used service node in the service call chain corresponding to the service call topology is less than or equal to a predetermined occasionally-used threshold; or deleting the occasionally-used service node in the service call topology, wherein the number of accumulated appearance times of the occasionally-used service node in the service call chain corresponding to the service call topology is less than or equal to the predetermined occasionally-used threshold, and wherein a number of accumulated appearance times of another service node different from the occasionally-used service node is greater than or equal to a predetermined frequently used threshold.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  identifying one or more service call chains in a distributed service system, each service call chain including one or more service nodes that are sequentially called by clients of the distributed service system;
  performing aggregation processing on the one or more service call chains with reference to call feedback information of the one or more service nodes in the one or more service call chains;
  generating a service call model corresponding to a particular service call chain from the one or more service call chains, wherein the service call model comprises one or more service call topologies, and wherein each service call topology is acquired by performing aggregation processing on the one or more service call chains;
  identifying calls to the particular service call chain by the clients of the distributed service system;
  updating performance statistics in the service call model for the particular service call chain, wherein the performance statistics are updated based on the identified calls to the particular service call chain;
  comparing, based on a predetermined duration comparison rule, each statistical result with corresponding call feedback information of each service node in the particular service call chain corresponding to the service call topology;
  when a difference exceeds a predetermined fluctuation threshold, generating alert information about the particular service call chain corresponding to the difference, wherein the alert information identifies a service node corresponding to the difference;
  identifying, based on the alert information, a performance problem associated with the particular service call chain; and
  in response to identifying the performance problem associated with the particular service call chain, initiating corrective action for the identified performance problem.

12. The computer-implemented system of claim 11, wherein identifying the one or more service call chains comprises:
  acquiring service call log information from the distributed service system; and
  extracting the one or more service call chains from the service call log information, wherein each service call chain comprises the one or more service nodes that are sequentially called.

13. The computer-implemented system of claim 11, wherein generating the service call model comprises generating the service call model by performing aggregation processing on the service call chain, wherein the service call model comprises one or more service call topologies, wherein each service call topology is acquired by performing aggregation processing on one or more additional service call chains different than the particular service call chain; and
  wherein processing the service call chain comprises processing the service call chain according to a service call topology.

14. The computer-implemented system of claim 13, the operations further comprising:
  performing a data cleaning operation on the service call topology, wherein updating performance statistics in the service call model for the particular service call chain comprises updating performance statistics in the service call model for the particular service call chain according to a cleaned service call topology.

15. The computer-implemented system of claim 14, wherein the data cleaning operation comprises at least one of:
  deleting a predetermined service node in the service call topology;
  deleting a service node that is in the service call topology and that does not return call result information;
  deleting an occasionally-used service node in the service call topology, wherein a number of accumulated appearance times of the occasionally-used service node in the service call chain corresponding to the service call topology is less than or equal to a predetermined occasionally-used threshold; or
  deleting the occasionally-used service node in the service call topology, wherein the number of accumulated appearance times of the occasionally-used service node in the service call chain corresponding to the service call topology is less than or equal to the predetermined occasionally-used threshold, and wherein a number of accumulated appearance times of another service node different from the occasionally-used service node is greater than or equal to a predetermined frequently used threshold.

* * * * *